United States Patent
Gilboy

(10) Patent No.: US 6,195,419 B1
(45) Date of Patent: Feb. 27, 2001

(54) SUBACCOUNT DIRECT BILLING METHOD AND APPARATUS

(75) Inventor: Christopher P. Gilboy, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/998,404

(22) Filed: Dec. 24, 1997

(51) Int. Cl.[7] .................................................. H04M 15/00
(52) U.S. Cl. ........................... 379/111; 379/112; 379/114; 379/127
(58) Field of Search ............................ 379/111–114, 120, 379/133–134, 127, 119, 135, 144, 115, 116, 121, 67.1, 76, 88.19, 88.2, 88.21, 93.23, 354

(56) References Cited

U.S. PATENT DOCUMENTS

| 4,776,004 | 10/1988 | Bauer et al. ........................ 379/127 |
| 5,287,270 | * 2/1994 | Hardy et al. ............................. 705/34 |
| 5,325,421 | * 6/1994 | Hou et al. .......................... 379/88.03 |
| 5,440,621 | * 8/1995 | Castro .................................. 379/112 |
| 5,450,477 | * 9/1995 | Amarant et al. ................... 379/91.02 |
| 5,511,114 | * 4/1996 | Stimson et al. ....................... 379/114 |
| 5,539,807 | 7/1996 | Ghisler et al. ......................... 379/58 |
| 5,771,282 | * 6/1998 | Friedes ................................ 379/121 |
| 5,774,533 | * 6/1998 | Patel .................................... 379/127 |
| 5,825,863 | * 10/1998 | Walker . |

* cited by examiner

Primary Examiner—Duc Nguyen

(57) ABSTRACT

A method and apparatus are provided to support the direct billing of various subaccounts within a subaccount bill to a variety of billing payment mechanisms including calling cards, credit cards, prepaid cards, debit cards, and third party numbers. Additionally, call history between the calling party and the dialed number is used to anticipate the desired subaccount number. The calling party can overide this capability by providing a different subaccount number.

5 Claims, 4 Drawing Sheets

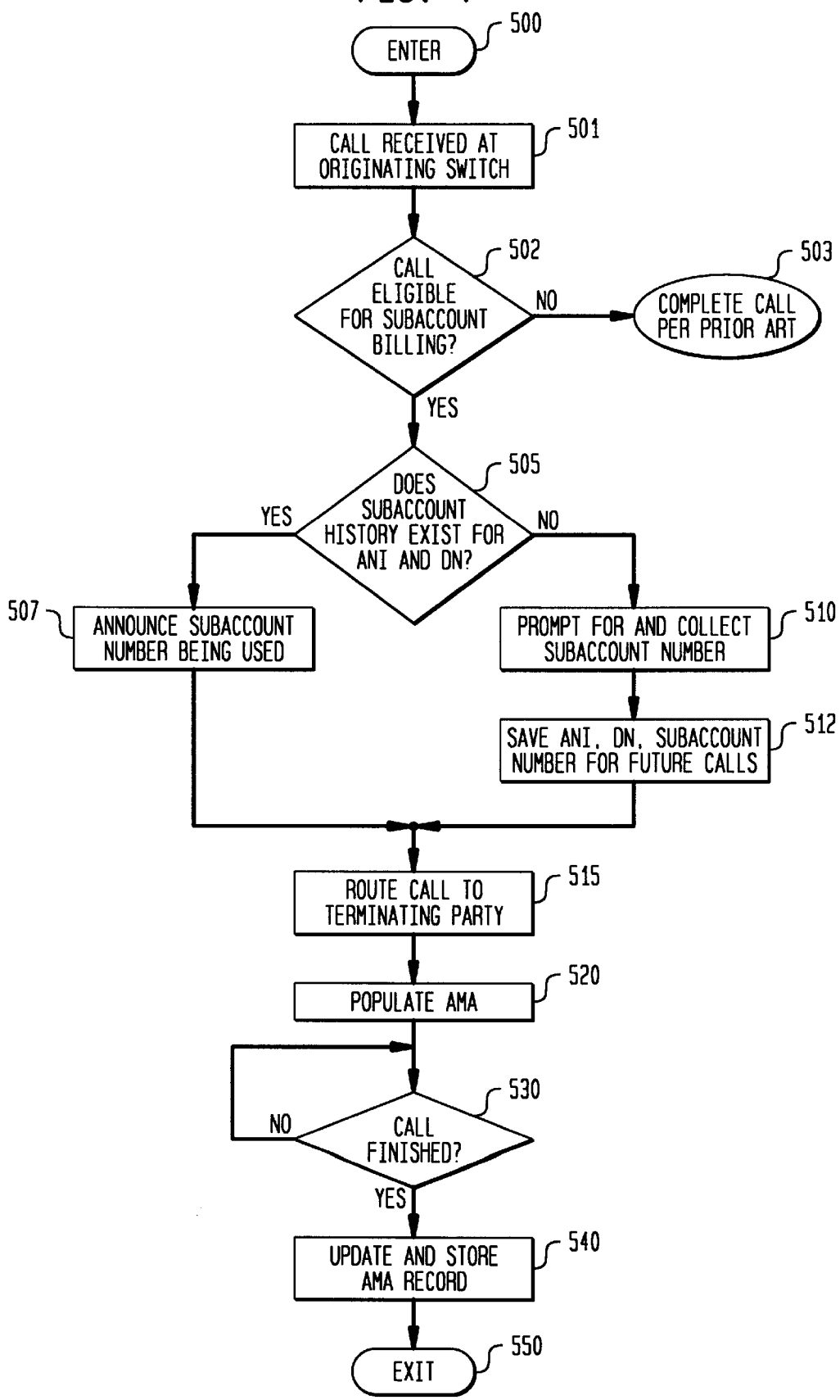

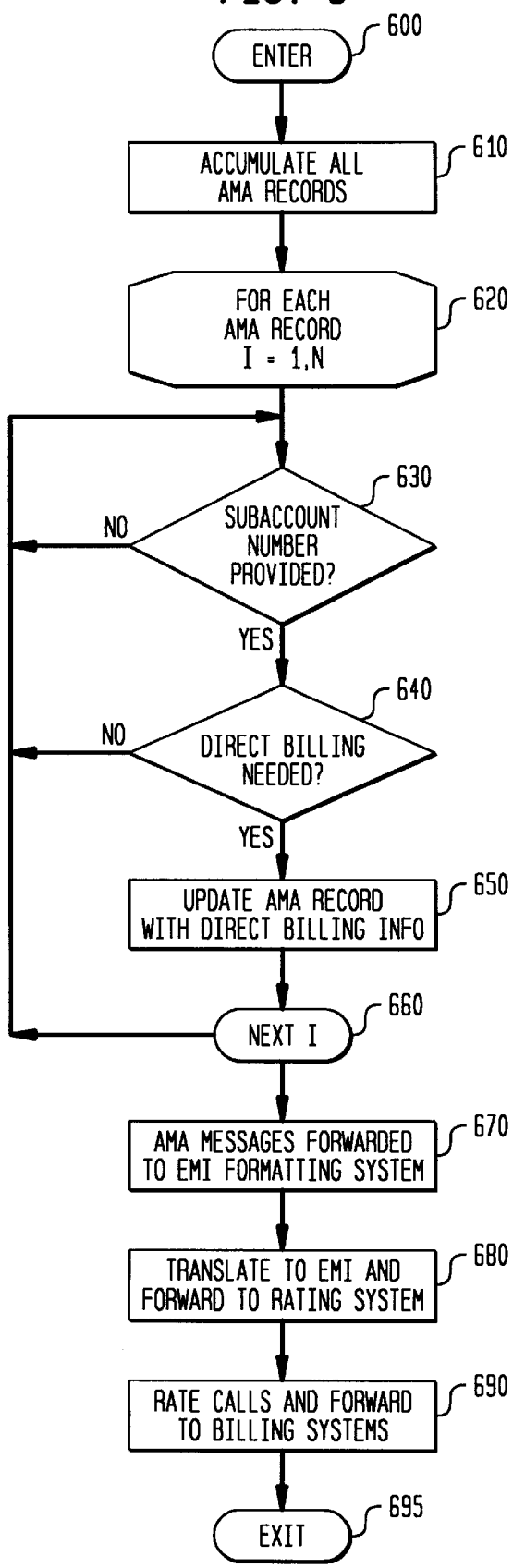

SUBACCOUNT DIRECT BILLING METHOD AND APPARATUS

TECHNICAL FIELD

This invention relates to the field of telecommunication services and, in particular, to a method and apparatus for direct billing derived subaccount charge information for a call.

BACKGROUND OF THE INVENTION

Originally, subaccount billing services in which charges for telephone calls to the customer are sorted and listed under separate subaccount numbers assigned by the customer were offered on a presubscription basis only. In U.S. Pat. No. 4,776,004, Bauer et al, entitled "Communication Service Method and Apparatus," a method and apparatus were defined for subaccount billing which allowed a subscriber to enter, in real time for each telephone call, a subaccount code entered via dual tone multi-frequency (DTMF) digits. The entered subaccount code is used by a telecommunications services billing system to categorize telephone calls in different accounts on a telephone services bill. Bauer et al, '004, permitted subaccount billing service offered on a "per call" or "as needed" basis.

In the prior art, the customer's monthly phone bill is simply a summation of each is individual subaccount. Therefore, the customer pays the bill in full using a single payment method each month. The prior art does not address permitting a customer to establish a billing arrangement by subaccount so that the subaccount can be directly and individually billed to separate, desired payment methods.

SUMMARY OF THE INVENTION

The foregoing problems and associated disadvantages of the prior art are overcome and technical advances achieved in the present invention whereby the customer can establish a direct billing relationship for each subaccount within the subaccount bill. The direct billing mechanism includes any type of alternate billing arrangement such as a personal calling card, a corporate calling card, credit card, a pre-paid card, a debit card, a collect call, or a third party number. Thus, the present invention permits a caller to make calls and either have each call billed in a preselected manner or, prior to each call, to define the call billing arrangement at the time of the call. Such billing arrangements for any subscriber would be set-up and confirmed in advance.

The service involves a customer utilizing a telephone, computer, facsimile machine, or other device, to initiate a call. An originating switch forwards the originating caller's automatic number identification (ANI) to a subscriber database which searches for a record match to see if the originating caller is subscribed to the service. Assuming the caller is subscribed to the service, the caller is given the opportunity to enter a subaccount number via DTMF entry. The caller is then connected through a transit network and a terminating switch to the receiving party's telephone device. That information is coupled by the originating switch through a message accumulator. The message accumulator is coupled into a direct bill database as well as through an exchange message interface (EMI) formatting system and a rating system to a billing system to route the charges, at the direction of the originating party, to be billed to the proper subaccount.

Furthermore, it is a feature of the present invention that where a particular number called is repeatedly matched to a particular subaccount by the subscriber, the invention may automatically asssign the call to that subaccount on all subsequent calls. However, the calling party can override this determination and direct the billing to a different subaccount upon initiation of the call.

These and other features of the present invention will become clear from the following detailed description when taken in conjunction with the drawings.

BRIEF DESCRIPTION OF THE DRAWING

FIG. 4 is a logic diagram illustrating the steps of the subaccount billing service of the present invention; and FIG. 5 is a logic flow diagram of the steps performed in bill creation for the present invention.

DETAILED DESCRIPTION

Figure 1:
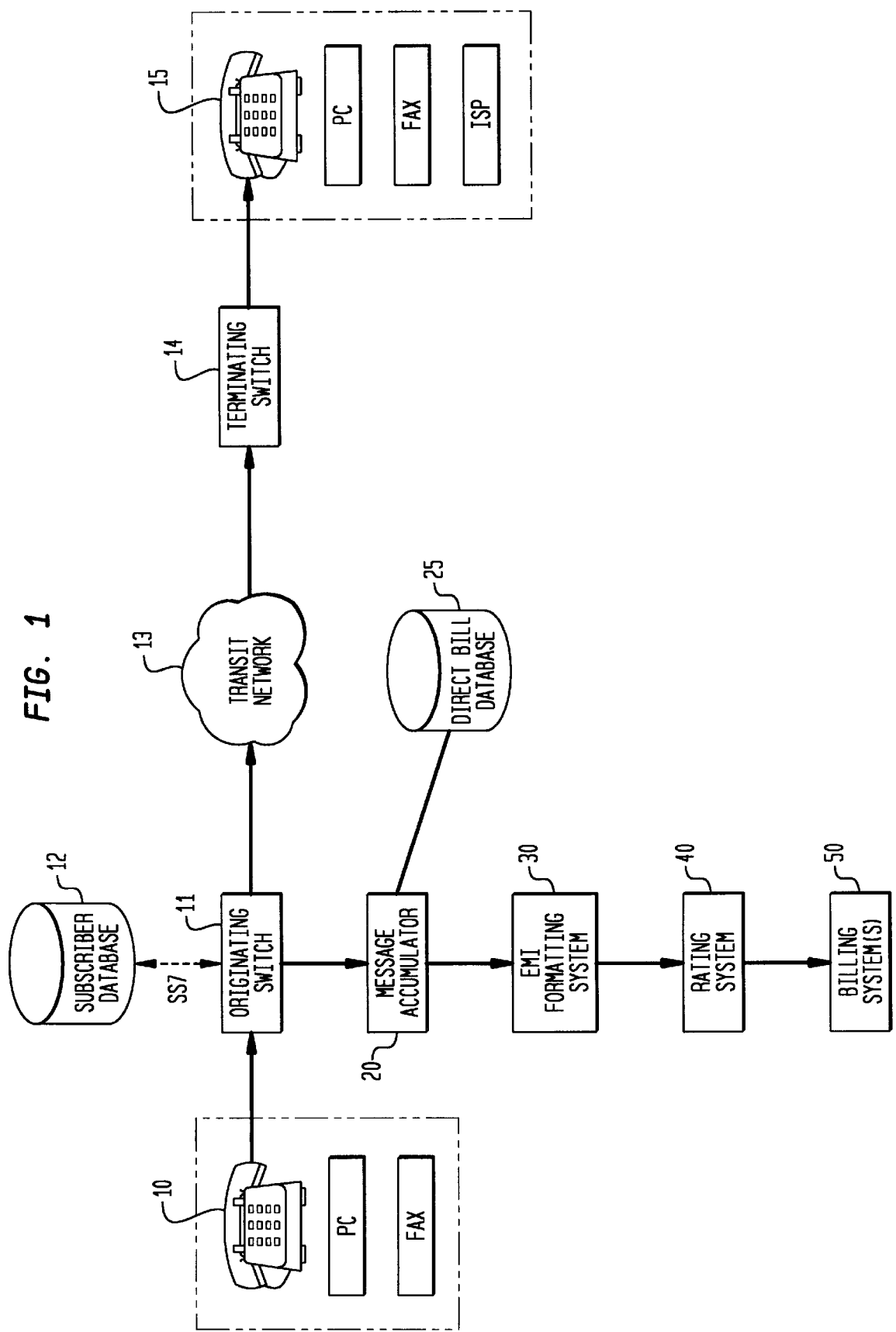
FIG. 1 depicts an illustrative subaccount billing system incorporating the present invention.

Referring now to FIG. 1, the telephone network used to implement the subaccount direct billing system comprising the present invention is shown. A calling or originating party uses a data signal device 10 to initiate a call. Data signal device 10 may be any communication device such as a telephone set, a computer equipped with a modem, a facsimile machine, cellular phone or similar device capable of operating across a telephone network. A signal from data signal device 10 is coupled to originating switch 11, which, by way of example and not by way of limitation, may be a conventional telephone switching system, such as a 4ESS or 5ESS switching system that stands alone, a combination system that includes a switch and an associated adjunct, or, for use with a data network, a router. Switch 11 forwards the originating caller automatic number identification (ANI) to a subscriber database 12 having a listing of subscribers to a subaccount billing service which incorporates the principles of the present invention. Subscriber database 12 searches its data for a record match with the ANI to see if the originating caller is subscribed to the service. Subscriber database 12 also determines a call history between the calling party and the dialed number. If there is a call history, the call history may determine a predefined subaccount number exists and couples it into switch 1.

Upon receiving the subaccount data from subscriber database 12, a voice prompt may advise the subscriber that the call will be billed according to the call history determined subaccount unless the caller enters an alternate subaccount number. If an alternate subaccount is entered, the entered subaccount becomes the subaccount used for billing that call, otherwise, the subaccount from the call history is used for the billing.

The call is then coupled through a transit network 13 and a terminating switch 14 to the terminating party telephone device 15. As with data signal device 10, device 15 could be a telephone set, computer, facsimile machine, or other device. Upon connection with the terminating party's device 15 and ascertaining that the originating party is a subscriber, billing information is coupled from initiating switch 11 to message accumulator 20 which is interfaced to a direct billed database 25. Database 25, which may be internal or external to accumulator 20, provides prestored information as to the type of billing associated with the subaccount which may include any type of alternate billing arrangement such as a personal calling card, a corporate calling card, credit card, a pre-paid card, a debit card, a collect call, or a third party number.

Figure 2:
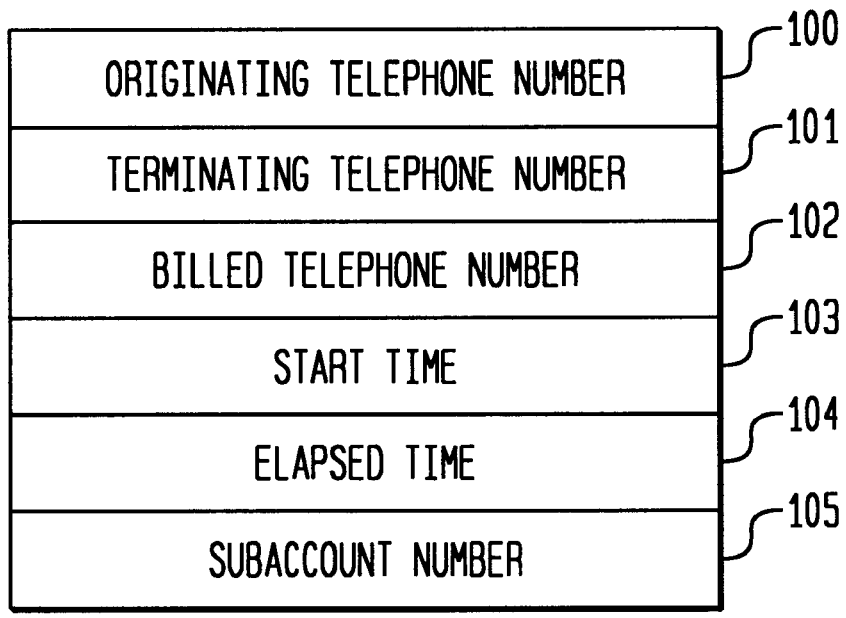
FIG. 2 depicts an illustrative automatic message accounting (AMA) billing record format used in the present invention.

Call information is also coupled into formatting system 30 which puts the call information into an automatic messaging accounting (AMA) billing record layout or format as shown in FIG. 2. Each telephone call generates an AMA record so that the telephone call can be properly billed.

Referring to FIG. 2, the AMA record layout consists of an originating telephone number 100, which is the 10 digit number of the originating party, a terminating telephone number 101, which is the 10 digit number of the terminating party dialed by the originating party, a billed telephone number 102, which is a 10 digit number that the call is billed to when it is not billed to the originating telephone number, a start time 103, which is the time of the start of the call, an elapsed time 104, which is the length of the telephone call from the time of connection with the terminating party to the completion of the call, and a subaccount billing number 105, used on calls authorized to use subaccount billing. (Ten digit telephone numbers are used by way of example as being in accordance with the North American Numbering Plan; other formats besides a three digit area code and seven digit directory number may be applicable in other countries of the world). If subaccount billing is not authorized, field 105 will be left blank and the call will be completed and billed as in the prior art.

Figure 3:
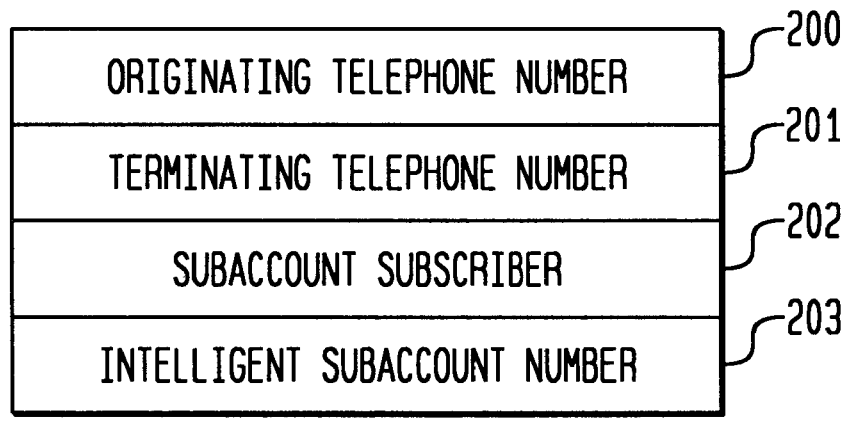
FIG. 3 illustrates the subscriber database output billing format of the present invention.

Referring now to FIG. 3, originating switch 11 passes information to subscriber database 12 to ascertain if the originating party is a subscriber. The information passed is in a format which includes the originating telephone number 100, now identified by the reference 200. and the terminating telephone number 101 now identified by the reference 201, to represent the same information but stored in a different data memory. The originating telephone number 200 is used by subscriber database 12 to determine if the caller is a subscriber and, if so, subscriber field 202 is set to an affirmative position. If the caller is not a subscriber, field 202 is set to a negative position and subaccount number field 105 of the AMA record is left blank.

During this query of subscriber database 12, subscriber database 12 also ascertains if a sufficient history relating to the connection between the originating and terminating parties exists from which the desired subaccount to be billed can be determined. If sufficient history exists, the subaccount billing information from the subscriber database 12 is loaded into intelligent subaccount number field 203, permitting direct billing to the proper subaccount without further input from the originating party. (The names of all fields 100–203 are chosen as representative only and different telecommunications service providers may use alternative names).

In operation, the sequence of events for a telephone call in accordance with the present invention is shown in FIG. 4. Prior to a call, the system is in an initialized, ready state 500. When originating switch 11 receives an incoming call 501, the originating switch 11 queries the subscriber database 12 to determine if this particular call is eligible for subaccount billing 502. Switch 11 sends originating telephone number 100 and terminating telephone number 101 to subscriber database 12. Subscriber database 12 then looks through the subscription data for a record that has an exact match with an originating caller's ANI. If a match is not found, subaccount subscriber field 202 is set to 'NO' or the Boolean equivalent "0" and the call is processed in accordance with the prior art and routes the call as a regular telephone call 503.

When a match is found, subaccount subscriber field 202 is set to 'YES', or the Boolean equivalent '1' and the database is checked for any call history (calls placed) from the ANI to the dialed number (DN). If any previous call history is found, the subaccount number which was used during the previous call is announced to the calling party and used in billing the present call. This step frees the calling party from having to enter the same subaccount number for every call to the same dialed number. At this point the originating party could decide to override the previous history by entering a different subaccount number, otherwise, the call will proceed using the previously entered subaccount number as the present subaccount number.

However, where no previous call history is found from the ANI to the DN, the originating party is prompted for the subaccount number at 510. The calling party enters the desired subaccount number using a dual tone multi-frequency (DTMF) telephone key pad with the new subaccount number saved with the calling party's ANI and the DN at 512 as a history for future reference. (Anytime herein where DTMF and DTMF signal decoders are implied, typically, voice recognition circuitry should be recognized as a well known equivalent).

The originating switch 11 routes the call at 515 through transit network 13 and terminating switch 14 to terminating device 15. The AMA record is then populated at step 520 with the standard AMA information, including the start time of call, ANI, dialed number, etc. The AMA (FIG. 2) is also populated with the subaccount number entered by the originating party. The two parties continue with the call until it is completed. When the call is completed the AMA record is updated 540, with the duration of the call and the AMA record is then stored for future use and processing 512. The system then resets 550, 500, to await the next call.

Referring now to FIG. 5, the sequence of events for creating the telephone bill is illustrated. The billing system is initialized at 600 and all AMA records are accumulated at 610 by message accumulator 20. Each AMA record accumulated is checked at 620 to see if a subaccount number 105 is present at 630. If not, then the call is not eligible for subaccount billing and the system proceeds to the next AMA record. If a subaccount number 105 is present, then the call is eligible for subaccount billing and the system checks to see if direct billing is required at 640. At the same time, message accumulator 20 checks direct bill database 25 to see if the subaccount number associated with the AMA record has an entry in the database that specifies how the call should be direct billed.

If direct bill database 25 does not find a match, then the AMA does not require direct billing, and proceeds to the next AMA record. If a match is found, the message accumulator updates at 650 the current AMA record with the direct billing information from direct bill database 25. This is done by updating the billed telephone number field 102 of the AMA record shown in FIG. 2 with the direct billing information including such information as a credit card number, a calling card number, a third party number stored in direct bill database 25 , and the like.

Once the system reaches the last AMA record, all AMA records for this billing cycle have been checked for direct billing and have been updated to be direct billed as appropriate.

Message accumulator 20 periodically couples at 670 the AMA records into the EMI formatting system 30 which translates at 680 the AMA records into the Industry-Standard "Exchange Message Interface" or EMI record format and then forwards the records to rating system 40. Rating system 40 computes the telephone toll charges for each call, records those charges in the EMI record, and forwards the resulting EMI records to billing system 50, where they are stored until processed to generate the billings to be submitted in accordance with the subscriber instructions. The system then resets at 695, to 600, until the next billing cycle.

Whereas the present invention has been described in relation to the drawings attached hereto, it should be understood that other and further modifications can be made without departing from the scope and spirit of the invention. Any United States patent referenced herein should be deemed to be incorporated by reference as to its entire contents.

What I claim is:

1. A method for providing a calling party with direct billing of a call to a selected subaccount in a subaccount billing system, comprising the steps of:

receiving a call and detecting a calling number and a called number therefrom;

determining if said calling party is a subscriber eligible for subaccount billing;

comparing said calling number and said called number with information in a direct bill database to determine existence of a previously defined subaccount billing number relationship for billing calls between said calling number and said called number;

prompting said subscriber for a subaccount billing number and announcing to said calling party said previously defined subaccount billing relationship as a corresponding subaccount billing number to be used for billing said call; and billing accumulated charges to said previously defined subaccount billing number responsive to a subscriber to said prompt and announcement.

2. The method of claim 1, wherein said prompting step includes the step of allowing said calling party to enter a different subaccount billing number to be used as the billing subaccount number in place of said corresponding subaccount billing number.

3. The method of claim 2, wherein said different subaccount billing number is entered in the form of a DMTF digit sequence.

4. The method of claim 2, wherein said different subaccount billing number is entered in the form of a voice signal.

5. The method of claim 2, wherein said different subaccount billing number becomes said corresponding subaccount billing number in subsequent calls between said calling number and said called number.

\* \* \* \* \*